United States Patent
Peterac et al.

(10) Patent No.: US 10,773,904 B2
(45) Date of Patent: Sep. 15, 2020

(54) DISTRIBUTION HEAD OF AGRICULTURAL DEVICE

(71) Applicant: BEDNAR FMT s.r.o., Prague (CZ)

(72) Inventors: Jiri Peterac, Jicin (CZ); Pavel Syrovatka, Klenec-Roudnice nad Labem (CZ); Marek Prislinger, Nachod (CZ); Vojtech Bednar, Prague (CZ)

(73) Assignee: BEDNAR FMT S.R.O., Prague (CZ)

( * ) Notice: Subject to any disclaimer, the term of this patent is extended or adjusted under 35 U.S.C. 154(b) by 0 days.

(21) Appl. No.: 16/745,337

(22) Filed: Jan. 17, 2020

(65) Prior Publication Data

US 2020/0247621 A1 Aug. 6, 2020

(30) Foreign Application Priority Data

Feb. 4, 2019 (EP) ..................................... 19155198

(51) Int. Cl.
  *B65G 53/52* (2006.01)
  *B65G 53/40* (2006.01)
  *A01C 15/06* (2006.01)

(52) U.S. Cl.
  CPC .............. *B65G 53/40* (2013.01); *A01C 15/06* (2013.01)

(58) Field of Classification Search
  CPC ...... B65G 53/56; B65G 53/528; A01C 7/084; F16L 41/007; F16L 41/03; F16L 41/18;
  (Continued)

(56) References Cited

U.S. PATENT DOCUMENTS

| 3,515,315 A | 6/1970 | Kidd | |
|---|---|---|---|
| 3,814,378 A * | 6/1974 | Wurzburger | F16K 5/08 251/283 |

(Continued)

FOREIGN PATENT DOCUMENTS

| DE | 102016010270 A1 | 1/2018 |
|---|---|---|
| EP | 0803177 B1 | 4/2003 |

(Continued)

OTHER PUBLICATIONS

European Patent Office, European Search Report, dated Jul. 19, 2019, in EP19155198, filed Feb. 4, 2018.

*Primary Examiner* — Joseph A Dillon, Jr.
(74) *Attorney, Agent, or Firm* — Thedford I. Hitaffer; Hitaffer & Hitaffer, PLLC (57) ABSTRACT

A distributor head of a distribution agricultural device comprises an outer hoop provided with at least four outlets of the same size, arranged evenly along the circumference of the outer hoop, a movably positioned ring, a main inlet, and a driving mechanism connected with the ring through a ring attachment, wherein the ring is provided with a number of evenly arranged openings of the same size, number of which corresponds to half of the number of outlets. The ring can be in three operating positions, wherein in the first position, the ring is located in the same plane as the outer hoop and therefore covers every other outlet, in the second position it is not located in the same plane as the outer hoop and thus does not cover any outlet, and in the third position it is located in the same plane as the outer hoop and thus covers every other outlet, wherein the outlets covered in the third position are different from the outlets covered in the first position of the ring.

11 Claims, 11 Drawing Sheets

(58) Field of Classification Search
CPC .......... F16K 5/0407; Y10T 137/87748; Y10T 137/8782
USPC .......... 406/181, 182, 183; 137/875; 111/175
See application file for complete search history.

(56) References Cited

U.S. PATENT DOCUMENTS

| | | | | |
|---|---|---|---|---|
| 4,134,427 A * | 1/1979 | Vitner | ................. | G05D 11/03 137/876 |
| 4,169,491 A * | 10/1979 | Bajka | ................. | F16K 11/085 126/563 |
| 5,137,048 A * | 8/1992 | Brattoli | ................. | E03C 1/023 137/269 |
| 5,244,014 A * | 9/1993 | Lie | ................. | F16K 11/0525 137/625.46 |
| 6,641,336 B1 * | 11/2003 | Bolles | ................. | B65G 53/4633 406/183 |
| 6,955,188 B2 * | 10/2005 | Heckt | ................. | F01N 3/031 137/87.01 |
| 8,001,994 B2 * | 8/2011 | Miller | ................. | B08B 5/02 137/874 |
| 8,051,877 B2 * | 11/2011 | Lichney | ................. | B65G 53/56 137/625.47 |
| 8,544,498 B2 * | 10/2013 | Petersen | ................. | A01C 7/084 137/561 A |
| 8,555,795 B2 * | 10/2013 | Cheng | ................. | F23D 1/00 110/104 B |
| 8,684,636 B2 * | 4/2014 | Dunstan | ................. | A01C 7/081 406/181 |
| 8,894,330 B2 * | 11/2014 | Gluch | ................. | A24C 5/391 406/181 |
| 9,657,843 B2 * | 5/2017 | Lallemant | ........... | F02B 29/0418 |
| 9,708,168 B2 * | 7/2017 | Knieling | ................. | F16L 58/14 |
| 2003/0161694 A1 * | 8/2003 | Bauver | ................. | B65G 53/528 406/1 |
| 2008/0159818 A1 * | 7/2008 | Kato | ................. | F16K 11/052 406/183 |
| 2014/0311333 A1 * | 10/2014 | Hutzelmann | ......... | F01L 1/3442 91/418 |
| 2015/0345685 A1 * | 12/2015 | Landrum | ................. | F16K 41/03 137/15.01 |
| 2015/0369092 A1 * | 12/2015 | Parker | ................. | F01L 1/3442 123/90.12 |
| 2016/0234998 A1 * | 8/2016 | Gebbeken | ............... | A01C 7/102 |
| 2018/0245703 A1 * | 8/2018 | Chen | ................. | F16K 1/46 |
| 2019/0174668 A1 * | 6/2019 | Funck | ................. | A01C 7/084 |
| 2020/0025296 A1 * | 1/2020 | Cuiper | ................. | F16K 5/0471 |
| 2020/0079636 A1 * | 3/2020 | Wurzbauer | ........... | F16L 41/03 |

FOREIGN PATENT DOCUMENTS

| | | |
|---|---|---|
| EP | 1478221 B1 | 1/2007 |
| EP | 2269434 B1 | 9/2012 |
| WO | 2018046639 A1 | 3/2018 |

* cited by examiner

DISTRIBUTION HEAD OF AGRICULTURAL DEVICE

CROSS-REFERENCE TO RELATED APPLICATIONS

This application claims priority to EP Application No. 19155198, filed on Feb. 4, 2019, the disclosure of which are incorporated herein by reference.

FIELD OF THE INVENTION

The invention relates to a distributor head of a distribution agricultural device comprising an inner ring, which has three operating positions allowing to change the extent of the processed area.

BACKGROUND OF THE INVENTION

A distributor head of a distribution agricultural device is used for even distribution of seeds, fertilizing aggregate or other granulated material. It comprises a main inlet from a hopper of distributed material, which is usually fed to the distributor head by an air flow. The main exit is then divided by the internal mechanism of the distributor head into larger number of side outlets, which are arranged along the outer circumferential part of the distributor head. These outlets then distribute the granulated material to the individual exits evenly arranged on row units of the distribution agricultural device. As a result, even distribution of e.g. seeds on the area of processed soil is ensured.

When the field is of irregular shape or when adjusting tracks for different passages of sprinklers, it is necessary to selectively switch off some exits to avoid unnecessary waste of the distributed material on area not intended for growing crops. This selective switch-off is usually performed by mechanism which covers certain exits, so that the required extent is achieved.

Solution to this issue is presented, for example, in a patent document EP2269434 to Lemken company. A number of openings, which are used as side exits, are arranged along the circumferential part of the head at regular intervals. A mechanism for closing the individual exits is located in the inner part of the distributor. This mechanism consists of two, alternatively three, hoops. The first hoop has a number of openings arranged along its circumference, which correspond to the openings on the outer circumferential part of the head in terms of their position and number. Therefore, when using the first hoop, no openings are covered and seeds are distributed across the whole area. The second hoop has a number of openings arranged along its circumference, wherein the number of openings is lower than the number of openings of the first hoop, however, their positions correspond to some of the openings on the outer circumferential part of the head. As a result of using the second hoop, some openings are covered, which leads to changes in the area on which the seeds are sowed or fertilizer is distributed. A potential third hoop then ensures processing of another area. For example, with the second hoop, the left half of the distribution agricultural device is used, and the right one is used when using the third hoop. The disadvantage of this embodiment is the necessity to use at least two hoops, preferably three. These hoops move vertically within the distributor head. In practice, it often happens that the granulated material (seeds, fertilizer, etc.) gets into grooves, in which the individual hoops move. This causes the hoop movement to jam and it is necessary to disassemble and clean the distributor head, in order to ensure a fluent movement of the hoops.

Another solution to this issue is presented in a lapsed patent EP1478221 to Vaderstad company. Here, along the circumference of the outer part of the head, exit pairs are spaced in regular intervals. A closing device, which comprises a number of flaps, is located inside the inner part of the head. Depending on the position of the closing device, the flaps either cover none of the exits or half of the exits, thereby changing the extent of the area on which the granulated material is distributed. Because of the gaps between the individual exit pairs, the circumference of the distributor head is bigger than without gaps. This results in a need for a bigger head construction, i.e. poor folding of the whole structure of the distribution agricultural device and higher weight.

SUMMARY OF THE INVENTION

The mentioned drawbacks are at least partially eliminated by a distributor head of a distribution agricultural device comprising an outer hoop provided with at least four outlets of the same size, evenly arranged along the outer hoop circumference, movably positioned ring, main inlet, and a driving mechanism, wherein the ring is connected to the driving mechanism by a ring attachment. The distributor head ring is provided with evenly spaced openings of the same size, their number corresponds to half the number of outlets. The ring can be in three operating positions, where in the first position the ring is located in the same plane as the outer hoop and covers every other outlet, in the second position it is not located in the same plane as the outer hoop and thus covers no outlet, and in the third position it is located in the same plane as the outer hoop and covers every other outlet, wherein the outlets covered in the third position are different from the outlets covered in the first position.

The inner hoop of the distributor head of the distribution agricultural device can be provided with at least one guiding groove. The distributor head ring is then provided with at least one guiding pin, which is movably positioned in the guiding groove. In a preferred embodiment, the number of guiding grooves and guiding pins is three. The advantage of this embodiment lies in more fluent movement of guiding pins in guiding grooves and in more accurate adjustment of the ring position.

The driving mechanism of the distribution agricultural device includes a star, columns, and levers. The ring attachment is provided with openings, into which the columns of the driving mechanism are inserted.

In preferred embodiment, the driving mechanism of the distributor head of the distribution agricultural device is driven by at least one motor, wherein the motor and the driving mechanism are connected by levers. The advantage of this embodiment lies in a simple handling of the driving mechanism, movement of which can be controlled remotely.

The outer hoop of the distributor head of the distribution agricultural device must then be provided with an even number of outlets, preferably with twelve, twenty-four, thirty-six or forty-eight.

In preferred embodiment, the ring can be provided on its outer circumferential part with a brush. The advantage of using the brush lies in cleaning the inner space of the distributor head, which leads to lower need of maintenance of the inner space of the distributor head and more fluent movement of the ring due to the dirt removal.

The guiding groove can be of an arched shape, where, in the first operating position of the ring, the guiding pin is located at the beginning of the guiding groove, in the second operating position of the ring, the guiding pin is located in the center of the guiding groove, and in the third operating position of the ring, the guiding pin is located at the end of the guiding groove.

The guiding groove may be further T-shaped, where, in the first operating position of the ring, the guiding pin is located at the left side of the guiding groove, in the second operating position of the ring, the guiding pin is located at the top of the guiding groove, and in the third operating position of the ring, the guiding pin is located at the right side of the guiding groove.

The guiding groove may be further L-shaped, where in the first operating position of the ring, the guiding pin is located at the beginning of the base of the guiding groove, in the second operating position of the ring, the guiding pin is located at the top of the guiding groove, and in the third operating position of the ring, the guiding pin is located at the end of the base of the guiding groove.

DESCRIPTION OF DRAWINGS

The summary of the invention is further illustrated by examples of embodiments thereof, which are described by means of the attached drawings, where.

DESCRIPTION OF EXEMPLARY EMBODIMENTS

A distributor head 1 of a distribution agricultural device 100 shown in FIGS. 1, 5, 7 and 8 comprises an outer hoop 5, an inner hoop 3, a movably positioned ring 6, a main inlet 102 and a driving mechanism 9. The outer hoop 5 is provided with an even number of outlets 2, which are of the same size and are arranged evenly along the circumference of the outer hoop 5. In an exemplary embodiment of the invention, a total of 24 outlets 2 are arranged evenly along the circumference of the outer hoop 5. However, the invention is not limited to this number of outlets 2; 12, 24, 36 or 48 outlets 2 are often used in practice, and the invention can be used with any of these numbers.

Figure 2:
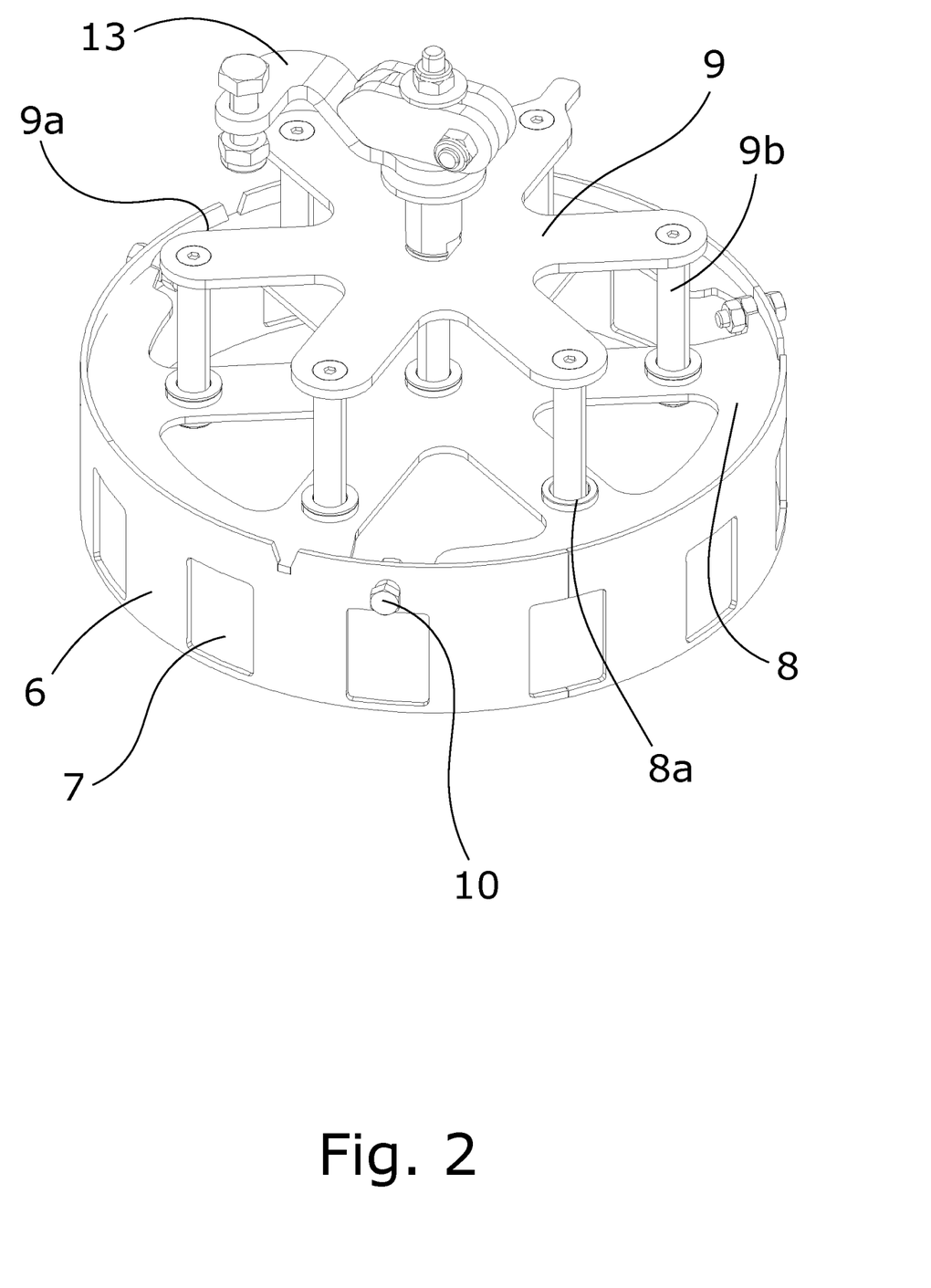
FIG. 2 shows the distributor head ring provided with evenly arranged openings of the same size, driving mechanism and the connection of the ring and the driving mechanism through the ring attachment.
Figure 3:
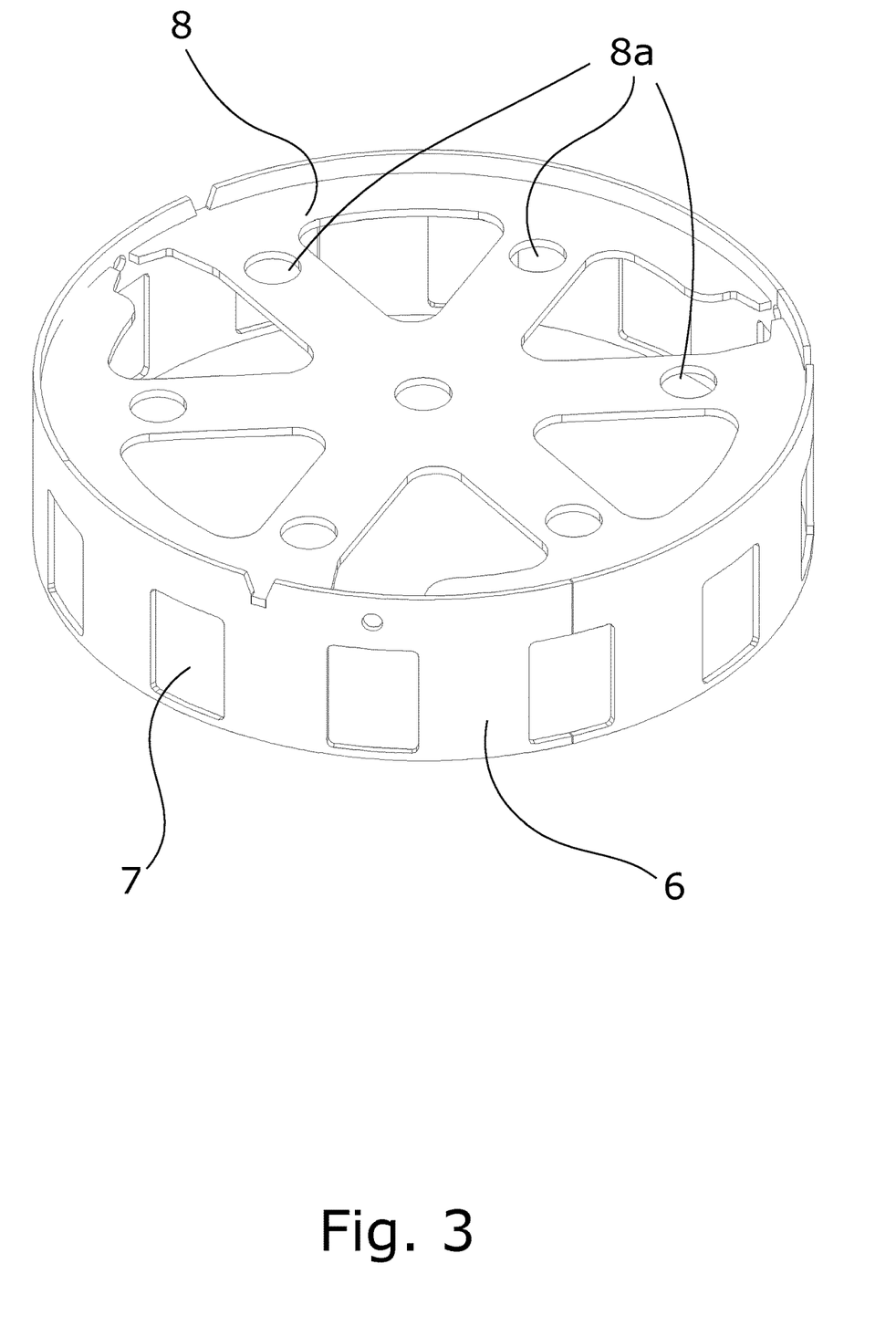
FIG. 3 shows the distributor head ring and the ring attachment.
Figure 4:
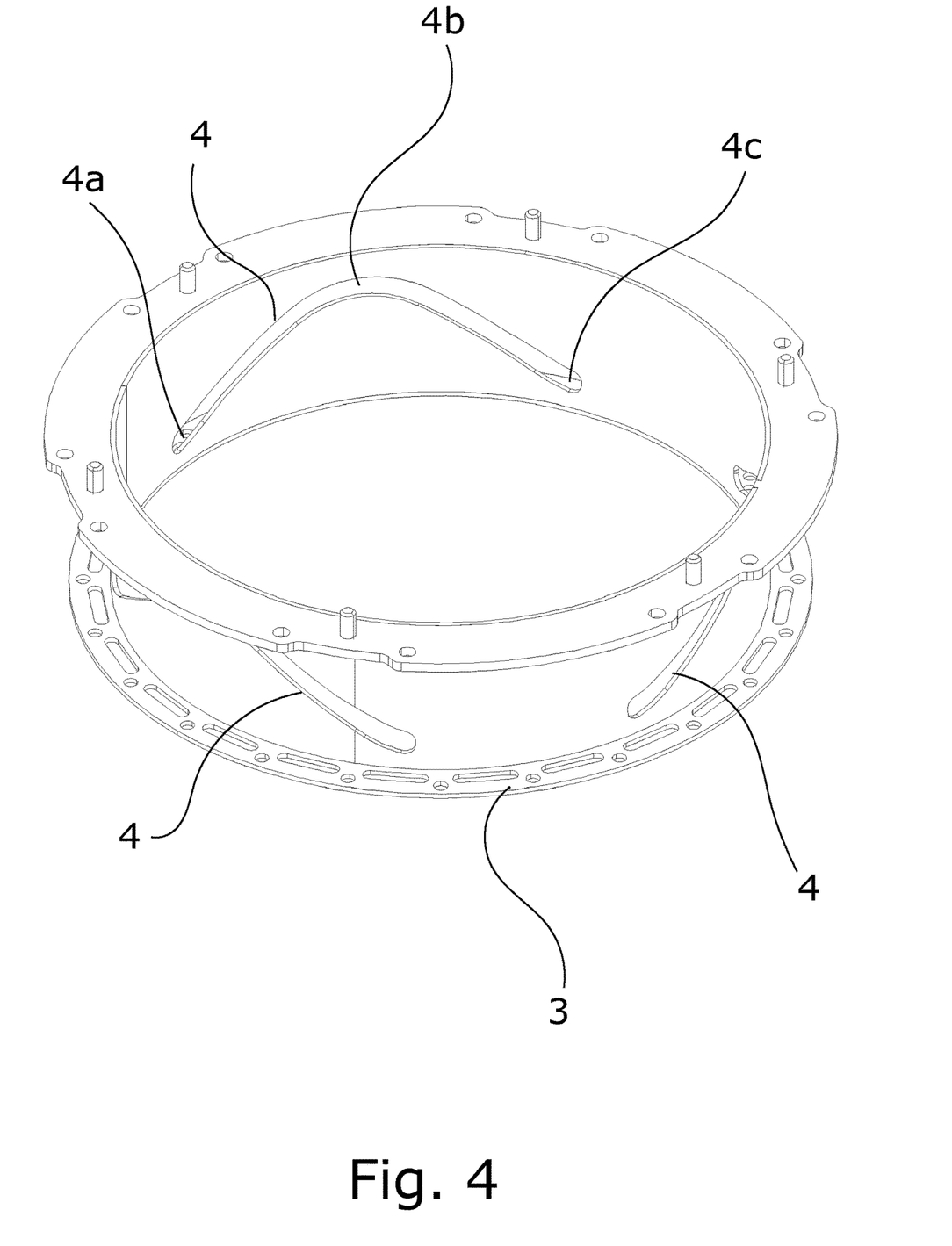
FIG. 4 shows the inner hoop of the distributor head provided with three guiding grooves of an arched shape.
Figure 5:
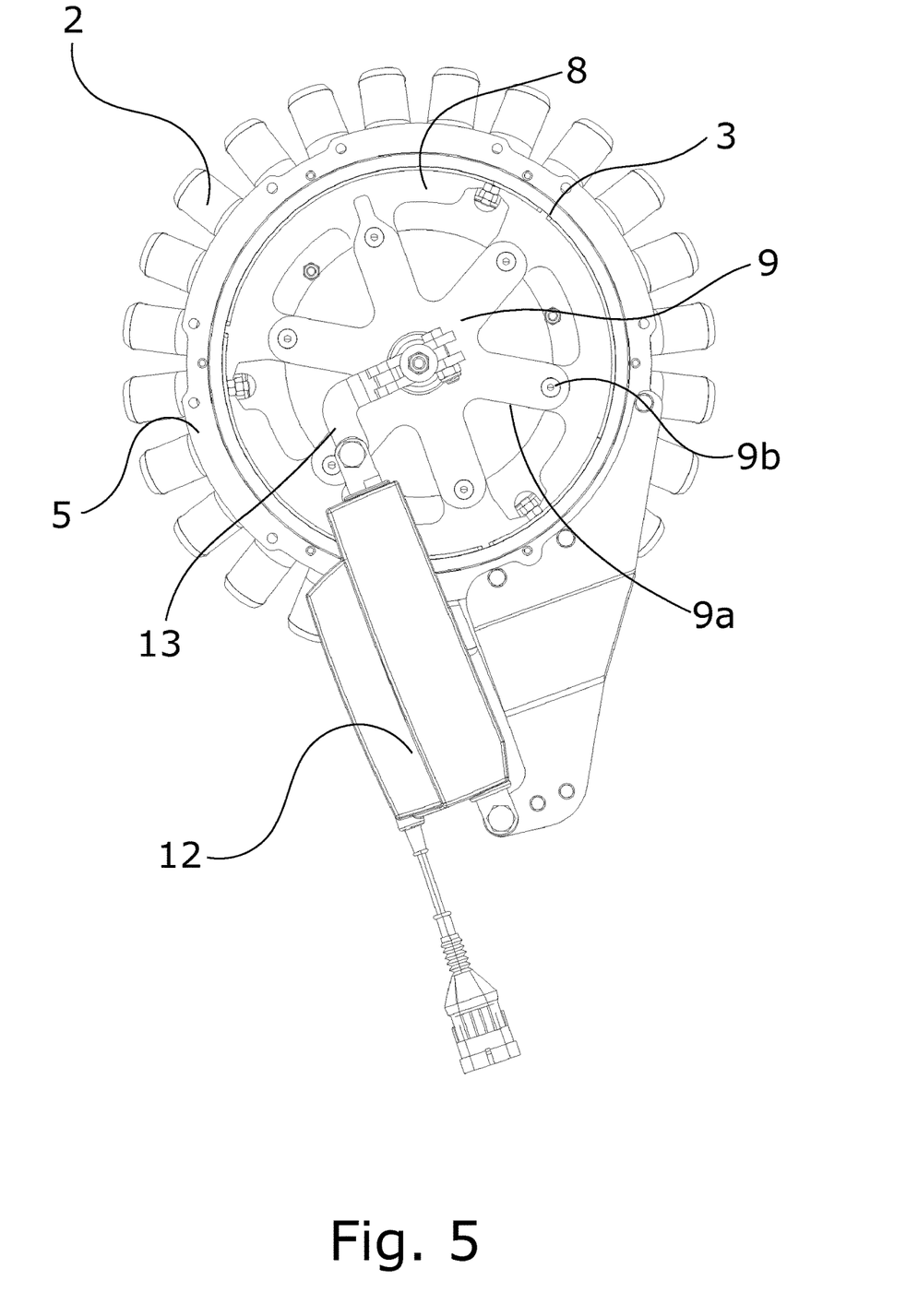
FIG. 5 shows a top view of the distributor head of the distribution agricultural device, where the driving mechanism is connected to the motor through levers.
Figure 6:
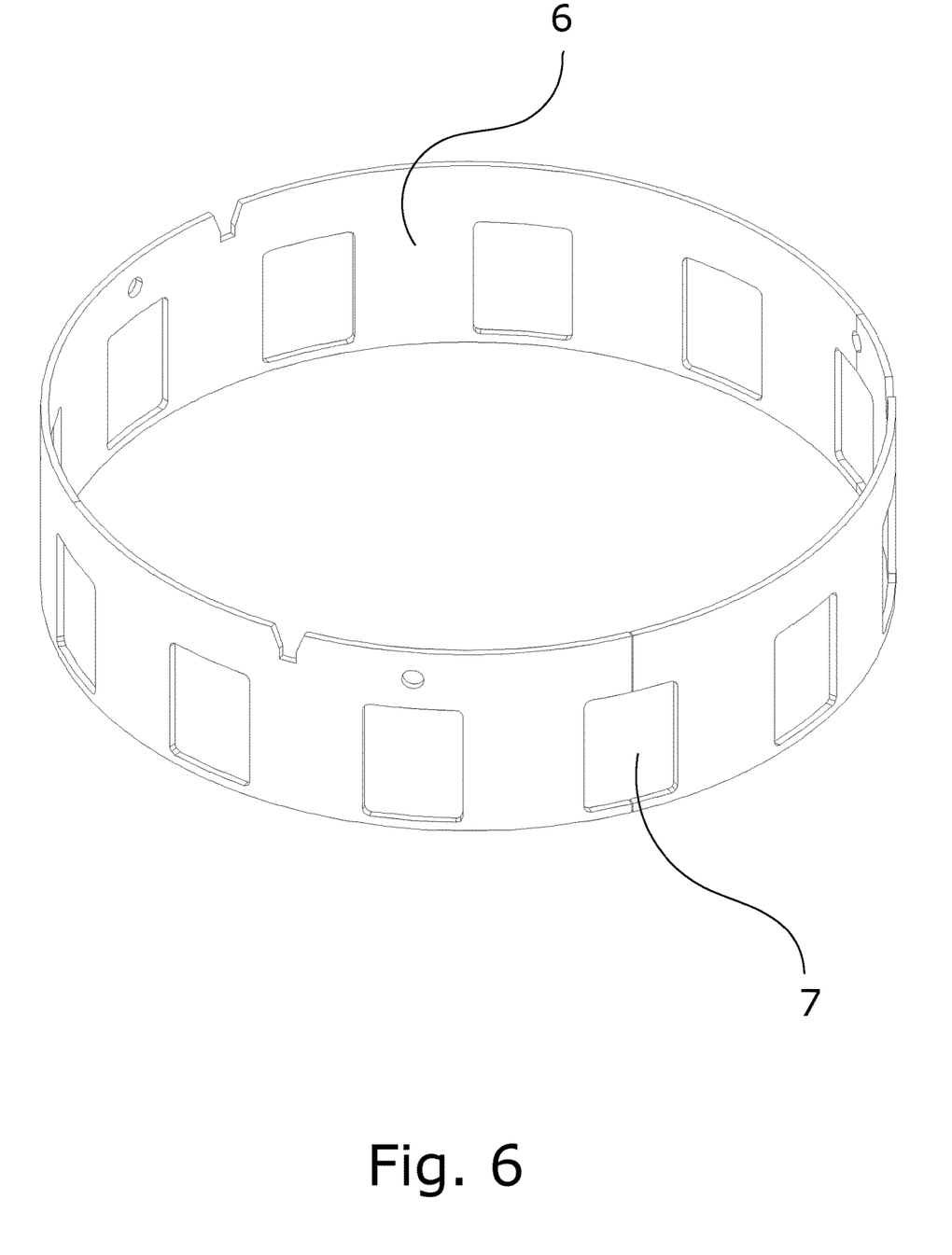
FIG. 6 shows the distributor head ring.

The inner hoop 3 of the distributor head 1 of the distribution agricultural device 100 is provided with at least one guiding groove 4, see FIG. 4. In the exemplary embodiment, this guiding groove 4 is of an arched shape, where the arched shape is a portion of the circumference of a circle, ellipse, or another conic section. In an exemplary embodiment, three significant points are on the guiding groove 4, namely the beginning 4a, the center 4b and the end 4c of the guiding groove 4, see FIG. 8. In the exemplary embodiment of the invention, the inner hoop 3 of the distributor head 1 is provided with exactly three guiding grooves 4. Further, a movably positioned ring 6 shown in FIGS. 2, 3 and 6 is located inside the distributor head 1. The ring 6 is provided with a number of openings 7, which are arranged evenly along its circumference. In the exemplary embodiment of the invention, the number of openings 7 in the ring 6 corresponds to the half of the number of outlets 2. The ring 6 is further provided with at least one guiding pin 10. In the exemplary embodiment of the invention the ring 6 is provided with exactly three guiding pins 10. Guiding pins 10 are movably positioned in the guiding grooves 4. The ring 6 is connected to a driving mechanism 9, shown in FIG. 2, through the ring 6 attachment 8. The driving mechanism 9 consists of a star 9a and columns 9b and ensures the movement of the ring 6. In the exemplary embodiment of the invention, the driving mechanism 9 is driven by a motor 12 shown in FIG. 5, to which it is connected through levers 13. However, embodiment of the invention with a manual drive of the driving mechanism 9 is also possible. The ring attachment 8 is provided with openings 8a, position of which corresponds to the position of columns 9b of the driving mechanism 9 in such way that the columns 9b are located in these openings 8a.

Figure 1:
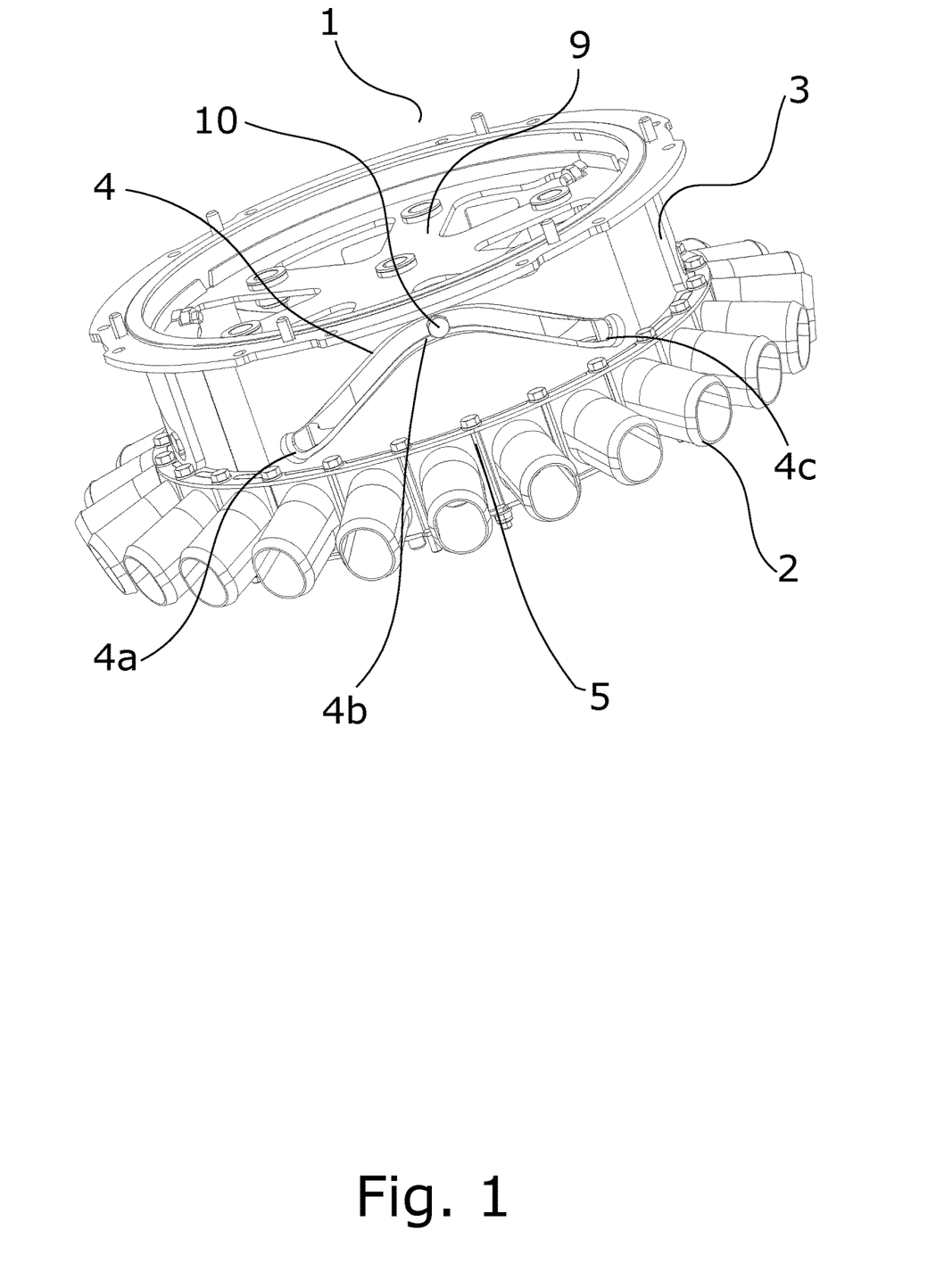
FIG. 1 shows the distributor head of the distribution agricultural device with the ring in the second operating position, where all outlets are open.
Figure 7:
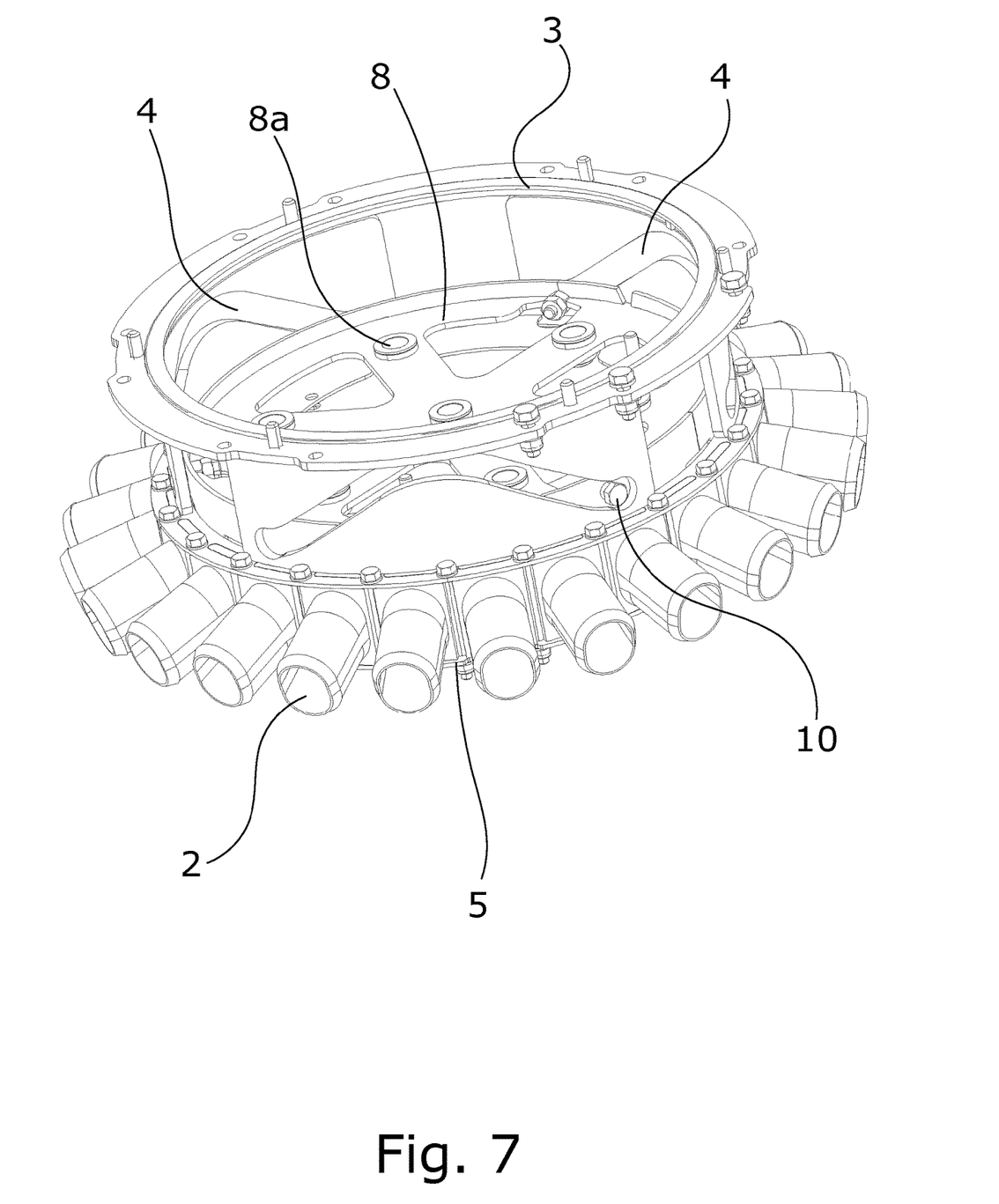
FIG. 7 shows the distributor head of the distribution agricultural device with the ring in the third operating position, where every other outlet is covered.
Figure 8:
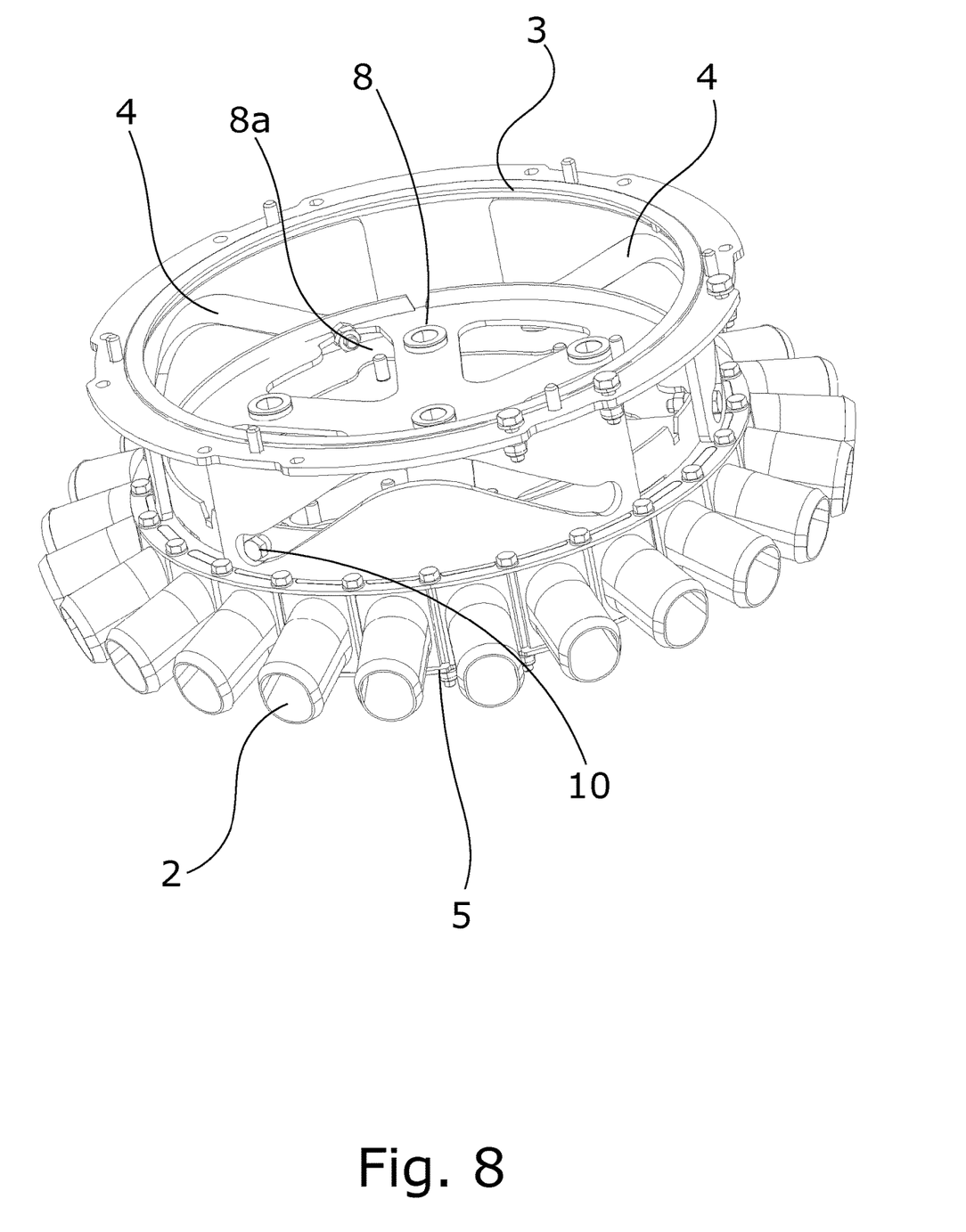
FIG. 8 shows the distributor head of the distribution agricultural device with the ring in the first operating position, where every other outlet is covered, wherein the covered outlets are different from the outlets covered when the ring is used in the third operating position.
Figure 9A:
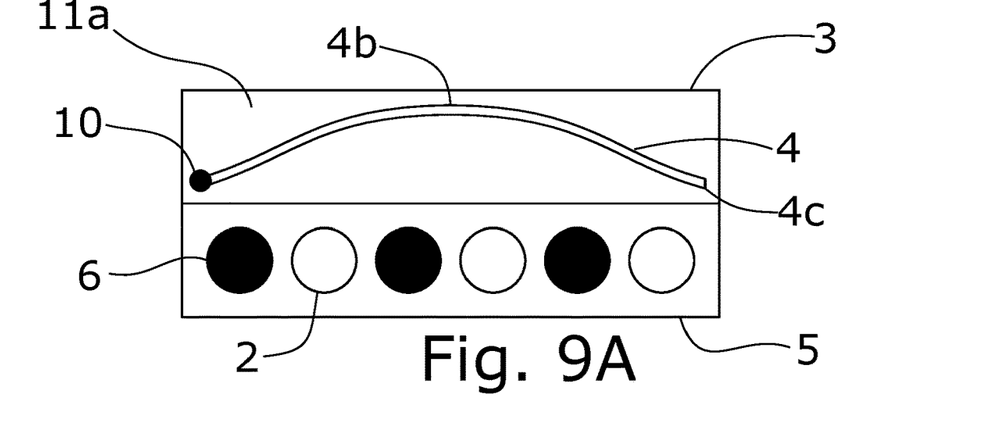
FIGS. 9A-C are schematic representations of the guiding groove of an arched shape showing the guiding pin position in the guiding groove for different operating positions of the ring.
Figure 9B:
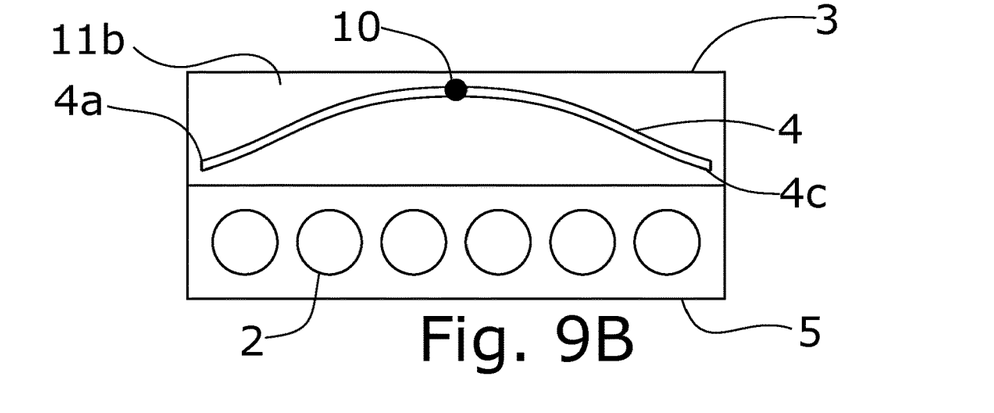
Figure 9C:
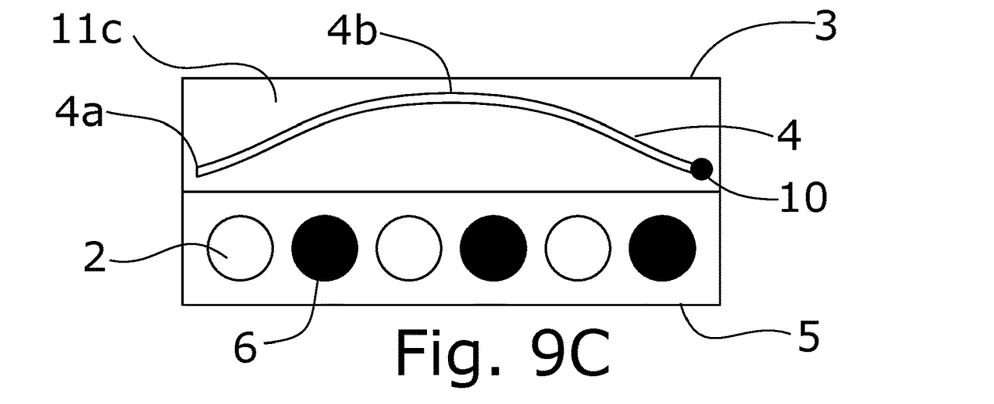

In exemplary embodiment of the invention, the ring 6 can be in three operating positions 11a, 11b and 11c shown in FIGS. 1, 7 and 8. In the first operating position 11a, shown in FIG. 8 and FIG. 9a, the ring 6 is in the same plane as the outer hoop 5. The guiding pin 10 is located at the beginning 4a of the guiding groove 4. In this position 11a every other outlet 2 is open, because of an overlap of the opening 7 in the ring 6 with the given outlet 2. The other outlets 2 are then covered with the ring 6. Because of this, the granulated material 103 is further distributed only within one half of the distribution agricultural device 100. In the second operating position 11b shown in FIG. 1 and FIG. 9b, the guiding pin 10 is located in the center 4b of the guiding groove 4. In this position 11b the ring 6 is not located in the same plane as the outer hoop 5 and, therefore, it does not overlap with any of the outlets 2. Because of this, the granulated material 103 is distributed to all outlets 2 and thus across the whole area of the distribution agricultural device 100. In the third operating position 11c, shown in FIG. 7 and FIG. 8c, the ring 6 is in the same plane as the outer hoop 5. The guiding pin 10 is located at the end 4c of the guiding groove 4. In this position 11c every other outlet 2 is open, because of the overlap of the opening 7 in the ring 6 with the given outlet 2. These are different outlets 2 from those that are open in the first operating position 11a of the ring 6. The remaining outlets 2 are then covered with the ring 6. Because of this, the granulated material 103 is further distributed only within one half of the distribution agricultural device 100, different from the half used in the first operating position 11a.

Figure 10A:
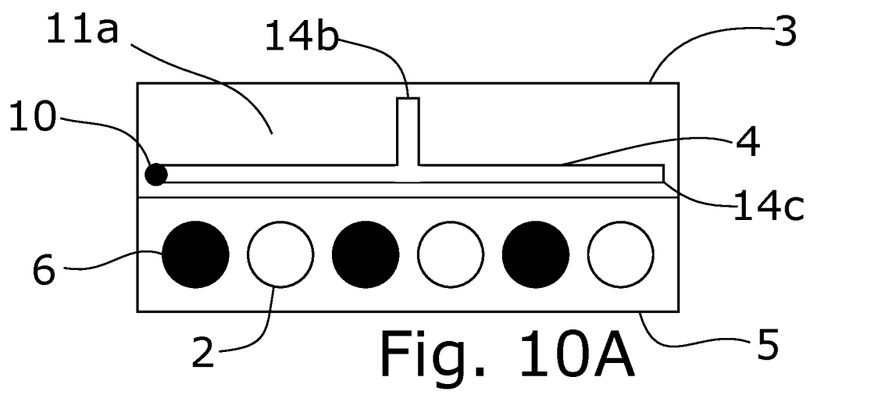
FIGS. 10A-C are schematic representations of the T-shaped guiding groove showing the guiding pin position in the guiding groove for different operating positions of the ring and FIGS. 11A-C are schematic representations of the L-shaped guiding groove showing the guiding pin position in the guiding groove for different operating positions of the ring.
Figure 10B:
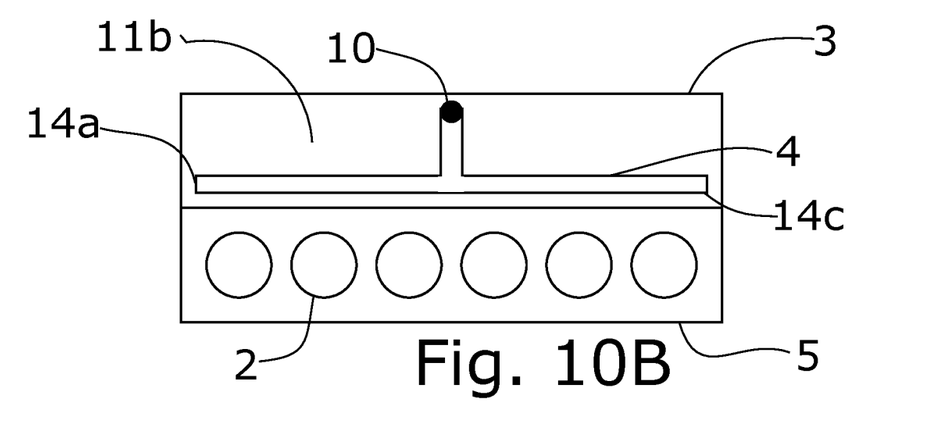
Figure 10C:
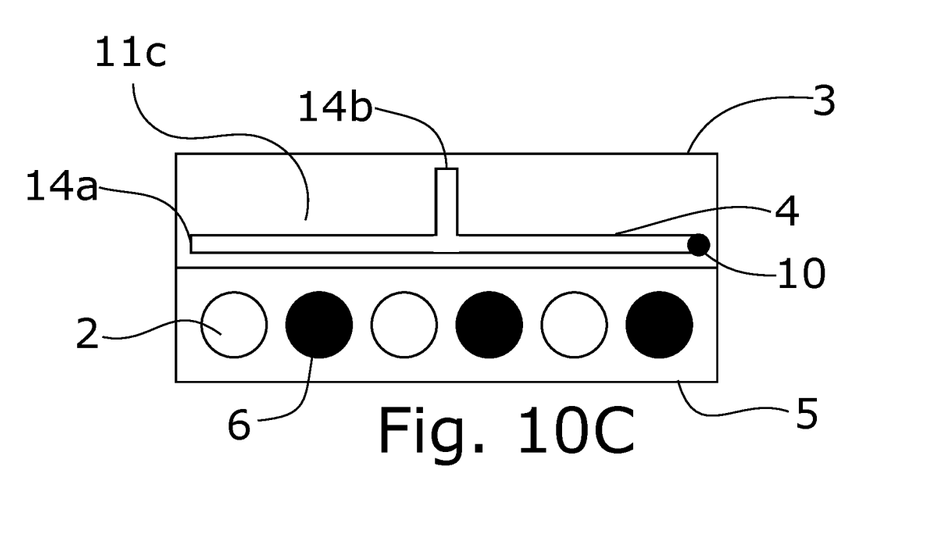

Other embodiments of the invention allow the use of a T-shaped guiding groove 4, see FIG. 10. In this embodiment, in the first operating position 11a the guiding pin 10 is then located at the left side 14a of the guiding groove 4, in the second operating position 11b the guiding pin 10 is located at the top 14b of the guiding groove and in the third operating position 11c the guiding pin 10 is located at the right side 14c of the guiding groove 4.

Figure 11A:
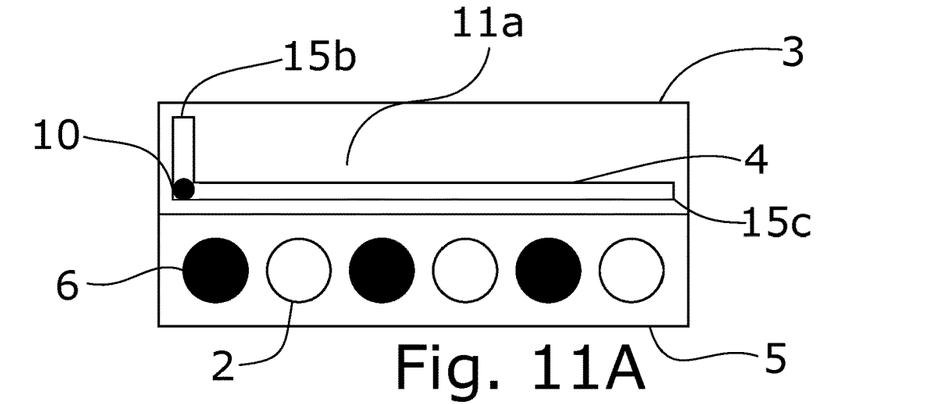
Figure 11B:
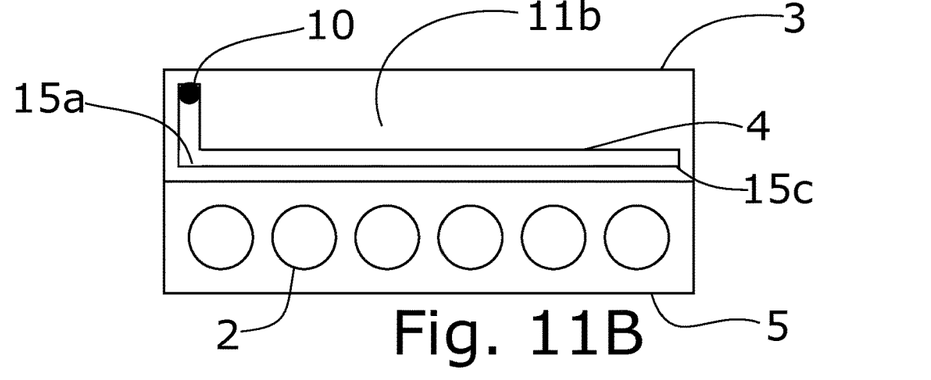
Figure 11C:
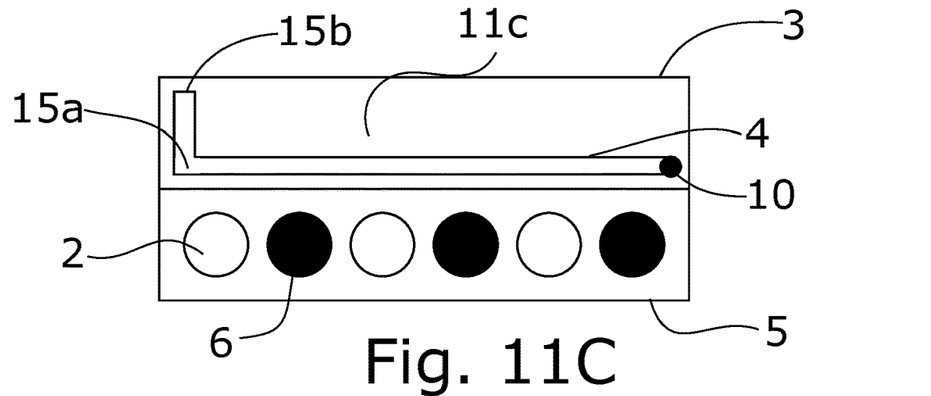

Other embodiments of the invention allow the use of a L-shaped guiding groove 4, see FIG. 11. In this embodiment, in the first operating position 11a the guiding pin 10 is then located at the beginning of the base 15a of the guiding groove 4, in the second operating position 11b the guiding pin 10 is located at the top 15b of the guiding groove, and in the third operating position 11c the guiding pin 10 is located at the end of the base 15c of the guiding groove 4.

Other embodiments of the invention which utilize a guiding groove 4 provided with three significant points in which the guiding pin 10 can be located in such way that in these points the ring 6 is located in individual operating positions 11a, 11b and 11c are also possible.

The ring 6 is moved between the individual positions by the driving mechanism 9, which is shown in FIG. 2. The movement of the ring 6 consists of a rotation around axis thereof and of displacement in the direction of the axis. The movement of the driving mechanism 9 is a rotation around the ring 6 axis. The rotation occurs due to the levers 13, which are connected to the driving mechanism 9. The driving mechanism 9 rotation around the ring 6 axis leads to the rotation of the attachment 8 and thus to the rotation of the ring 6 around the axis thereof. The rotation of the ring 6 around its axis then leads to movement of guiding pins 10 within the guiding grooves 4. Because of the movement of guiding pins 10 in the guiding grooves 4 the ring 6 moves also vertically in the direction parallel to the axis thereof. Together with the ring 6 the attachment 8 also moves vertically in such way that its openings 8a move within columns 9b of the driving mechanism 9.

In the case of L-shaped or T-shaped guiding groove 4, the driving mechanism 9 can be driven by two motors, where one motor ensures vertical displacement in the guiding groove 4 and the other motor ensures horizontal displacement in the guiding groove 4.

In exemplary embodiment of the invention, it is possible to extend the beginning 4a and the end 4c of the guiding groove 4, which results in better stability.

The distribution agricultural device 100 does not necessarily have to utilize just one distributor head 1 to divide the processed area into halves. The number of distributor heads 1 of the distribution agricultural device 100 may be higher, thereby providing a higher possibility to change the extent of the processed area.

The ring 6 can be, on its outer circumferential part, provided with a brush, which, when the ring 6 moves between its operating positions 11a, 11b and 11c cleans the area of the inner hoop 3 from dirt and provides more fluent movement of the ring.

INDUSTRIAL APPLICABILITY

The device according to this invention can be used for agricultural devices that use distributor heads for distributing granulated material, e.g. seeds, fertilizer, etc.

LIST OF REFERENCE SIGNS

1—distributor head
2—outlet
3—inner hoop
4—guiding groove
4a—beginning of the guiding groove
4b—center of the guiding groove
4c—end of the guiding groove
5—outer hoop
6—ring
7—opening in the ring
8—ring attachment
8a—attachment openings
9—driving mechanism
9a—star
9b—column
10—guiding pin
11a—a first position of the ring
11b—b second position of the ring
11c—third position of the ring
12—motor
13—levers
14a—left side of the guiding groove
14b—top of the guiding groove
14c—right side of the guiding groove
15a—beginning of the base of the guiding groove
15b—top of the guiding groove
15c—end of the base of the guiding groove
100—distribution agricultural device (not shown)
101—main inlet (not shown)
102—granulated material (not shown)

The invention claimed is:

1. A distributor head of a distribution agricultural device comprising an outer hoop provided with at least four outlets of the same size evenly arranged along the circumference of the outer hoop, a movably positioned ring provided with a number of evenly arranged openings of the same size, number of which corresponds to half of the number of outlets, a main inlet and a driving mechanism, wherein the ring is connected to the driving mechanism through a ring attachment, wherein the ring has three operating positions, where in the first position the ring is located in the same plane as the outer hoop and the ring covers every other outlet, in the second position the ring is not located in the same plane as the outer hoop and therefore does not cover any outlet, and in the third position, different from the first position, the ring is located in the same plane as the outer hoop and covers every other outlet, wherein in the third position the ring covers different outlets than in the first position.

2. The distributor head of the distribution agricultural device according to claim 1, wherein it further comprises an inner hoop provided with at least one guiding groove.

3. The distributor head of the distribution agricultural device according to claim 2, wherein the ring is provided with at least one guiding pin movably positioned in the guiding groove.

4. The distributor head of the distribution agricultural device according to claim 1, wherein the driving mechanism comprises a star, columns and levers and the ring attachment is provided with openings, wherein the columns are inserted in the openings of the attachment.

5. The distributor head of the distribution agricultural device according to claim 1, wherein the driving mechanism is driven by at least one motor, with which it is connected by levers.

6. The distributor head of the distribution agricultural device according to claim 1 wherein the number of outlets is twelve, or twenty-four, or thirty-six, or forty-eight.

7. The distributor head of the distribution agricultural device according to claim 3 wherein the number of the guiding grooves and guiding pins is three.

8. The distributor head of the distribution agricultural device according to claim 1 wherein the ring is provided with a seal brush on the outer circumferential part.

9. The distributor head of the distribution agricultural device according to claim 3 wherein the guiding groove of an arched shape, wherein in the first operating position the guiding pin is located at the beginning of the guiding groove in the second operating position the guiding pin is located in the center of the guiding groove, and in the third operating position the guiding pin is located at the end of the guiding groove.

10. The distributor head of the distribution agricultural device according to claim 3 wherein the guiding groove is T-shaped, wherein in the first operating position the guiding pin is located at the left side of the guiding groove, in the second operating position the guiding pin is located at the top of the guiding groove, and in the third operating position the guiding pin is located at the right side of the guiding groove.

11. The distributor head of the distribution agricultural device according to claim 3 wherein the guiding groove is L-shaped, wherein in the first operating position the guiding pin is located at the beginning of the base of the guiding groove, in the second operating position the guiding pin is located at the top of the guiding groove, and in the third operating position the guiding pin is located at the end of the base of the guiding groove.

* * * * *